US006188448B1

(12) United States Patent
Pauley et al.

(10) Patent No.: US 6,188,448 B1
(45) Date of Patent: Feb. 13, 2001

(54) FAST TUNING AUDIOVISUAL DISPLAY SYSTEM

(75) Inventors: Nicholas J. Pauley, Capistrano Beach; Adrian Hulse, Costa Mesa, both of CA (US)

(73) Assignee: Mitsubishi Digital Electronics America, Inc., Irvine, CA (US)

( * ) Notice: Under 35 U.S.C. 154(b), the term of this patent shall be extended for 0 days.

(21) Appl. No.: 08/977,232

(22) Filed: Nov. 24, 1997

(51) Int. Cl.$^7$ ........................................ H04N 5/44
(52) U.S. Cl. ............................. 348/731; 348/734
(58) Field of Search ................. 348/10, 11, 734, 348/725, 731; 455/150.1, 179.1, 185.1, 166.2, 166.1, 151.1, 151.2, 132, 133, 140; H04N 5/44, 5/455, 7/10

(56) References Cited

U.S. PATENT DOCUMENTS 4,518,993 * 5/1985 Okada et al. ............................ 348/11
5,420,647 * 5/1995 Levine ................................. 348/734
5,477,275 * 12/1995 Toyoshima et al. ................. 348/706

\* cited by examiner

*Primary Examiner*—David E. Harvey
(74) *Attorney, Agent, or Firm*—Lyon & Lyon LLP

(57) ABSTRACT

Systems and methods are provided for the fast and effective tuning of a dual tuning audiovisual display system, such as a television. The dual tuners are selectively coupled via a selector to the display. In the preferred embodiment, one tuner is adapted for connection to a cable system with tuning via a cable box, typically controlled by the television via transmission from the television. Ordinarily, the speed of channel changing on the cable box is slower than tuning via the tuner adapted for connection to the bare cable. A control system determines whether a desired channel is available in the channel map for the tuner adapted for connection to the bare cable. If it is available, the tuning is made with that tuner. If the desired channel is not available in that channel map, but is available in the channel map associated with the slower tuner, such as premium channels available through a cable box and the associated channel map, then the cable box containing tuner system is selected. In yet another aspect of this invention, preemptive tuning is utilized to pretune the currently unselected tuner to what is expected to be the next channel selection. In yet another aspect of this invention, channel remapping is utilized so as to effectively space apart channels on the channel map associated with the slower tuner, such that the occurrence of adjacent or nearby channels in the channel map of the slower tuner is reduced or eliminated.

17 Claims, 9 Drawing Sheets

72 CHANNEL MAP FOR TUNER TWO       71 CHANNEL MAP FOR TUNER ONE

FAST TUNING AUDIOVISUAL DISPLAY SYSTEM

FIELD OF THE INVENTION

This invention relates to audiovisual display systems, such as televisions. More particularly, it relates to audiovisual display systems having two or more tuners for selecting channels or sources of information. Most particularly, it is directed to television systems having two tuners, wherein one tuner is connected to a cable box and is under control of the television and another tuner is connected other than through a cable box.

BACKGROUND OF THE INVENTION

Various forms of audiovisual display systems which receive display information via electromagnetic transmission have been known to the art. One common example is a television, where the information to be displayed is transmitted from a broadcaster, cable head or other source by electromagnetic communication.

The earliest televisions utilized a single tuner connected to an antenna. The antenna would receive the transmitted electromagnetic information at various frequencies, and the tuner would be used to select a desired channel. Such systems were straightforward in that the information transmitted over the various channels was fully available for display on the television.

Over time, television signals were transmitted over cable. The use of cable provided for increased bandwidth compared to the prior systems, and afforded information providers the opportunity to provide more channels to the customer. Cable systems typically included various levels of programming, often offering a basic package which included those channels which were available through non-cable reception, namely, the publicly available or "free" channels. Further, cable systems often provided various "premium" channels, for which a cable subscriber was billed an additional amount beyond the basic services. Typically, a cable box is provided from the cable company to the customer which receives the cable information and serves as a channel selector for provision of the channel to the television. Ordinarily, a channel is selected for communication between the cable box and the television, often channel 3 as that channel is not typically utilized in public, over the air transmissions. The cable box serves as a decoder or descrambler for the various premium channels. Selective accessing of premium channels may be accomplished by the cable company, either locally or through the cable connection, programming the cable box. By doing so, the cable box maintains a list of entitled or accessible channels.

Televisions having two tuners are known in the art. FIG. 1 shows a simplified diagrammatic view of a dual tuner system. A television 10 includes a display 12. A first tuner 14 and a second tuner 24 are labeled tuner one and tuner two, respectively (though the designations may be reversed). The first tuner 14 has an input 16 adapted to be coupled to a source of picture information, such as supplied from cable box 30. A selector 32 (shown diagrammatically in FIG. 1) may provide a selective connection between the first tuner output 18 and the display 12. Similarly, the second tuner 24 receives as input 26 a signal from any number of sources, as shown in FIG. 1 being adapted to receive the cable input 34. The selector 32 may be selectively coupled to the tuner two output 28 to display the information from tuner two 24 on the display 12. While not shown in the simplified diagrammatic view in FIG. 1, such dual tuner televisions 10 may be used in picture-in-picture systems wherein a first display 12 further includes a reduced sized picture 36. Tuner one 14 would then supply the display information for the main display 12 and tuner two would supply the picture information for the reduced sized picture 36.

In typical operation, tuner one 14 is set to a selected channel, e.g., channel 3, which receives the output of the cable box 30 on that selected channel. The tuning of the system is then performed by tuning the cable box 30. The combined system of the cable box 30 and tuner one 14 serve to select the channel on the cable box 30, and to provide it to selector 32 via tuner one 14. Channel selection is typically made via the cable remote control 40.

Historically, such a dual tuner television system 10 when operated with a cable box 30, required multiple remote controls 40, 42. A cable remote 40 was used principally for purposes of channel changing. A television remote control 42 was principally used to change between tuner one 14 and tuner two 24, as well as to adjust the volume, set color levels and cause other television related features to be set or adjusted.

Recently, efforts have been made to reduce the number of remote controls required for operation of the television 10 and cable box 30. One effort utilizes the television 10 to control the cable box 30 under operation of a single remote control. When a request for a channel change is sent from the remote control 42 to the television 10, the television 10 in turn communications the channel change request to the cable box 30. Since no feedback is provided from the cable box 30 to the television 10 in such systems, it has proved necessary to provide control information from the television 10 to the cable box 30 in a relatively slow manner. Often, this control information transfer slows channel changing by a factor of 10.

FIG. 2 shows a chronologic display of channel entry, with time going from the left to the right. In order to effect a first channel change 50, the television 10 sends a first digit to the cable box 30 at a time designated by marker 52. At a later time designated by marker 54, the television 10 sends a second digit to the cable box 30. At time indicated by marker 56, the television 10 sends an enter command to the cable box 30. Finally, at time indicated by marker 58, the cable box 30 actually tunes. Thus, the cumulative time from the initiation of a request until actual changing of the cable box 30 can be significant, in current practice taking on the order of 2 seconds. When scrolling through channels, such as through the use of the up channel button or in reviewing favorite channel lists, the time becomes cumulative, and is often viewed as a significant annoyance to the viewer. As shown in FIG. 2, from the first change 50 to the fifth change 60, intervening changes are of substantially equal length.

Despite the desirability of having a two tuner system which may be controlled by a single remote, yet which does not suffer from the disadvantage of slow tuning, no optimal system has been yet presented. The system of this invention seeks to remedy those deficiencies.

SUMMARY OF THE INVENTION

Systems and methods are provided for the fast, effective tuning operation in a multiple tuner audiovisual display system. The system utilizes two or more tuners, which serve to select desired channels. A first tuner is adapted for connection to a source of coded information, such as a cable box. In the preferred embodiment, the combination of the first tuner and the tuner of the cable box together serve to select the desired channel and to supply the information to the display. At least one other tuner, denominated a second tuner, is adapted for connection to a source of information. A selector selectively couples a tuner to a display under action of a control system. The control system includes memory for storing indications of channel maps associated with the first tuner and cable box combination and the second tuner. The control system selects the second tuner when a channel is available as indicated by the channel map for that tuner, but selects the first tuner and cable box combination when the channel map indicates that the selected channel is available on the first tuner and cable box combination, but not on the second tuner. In the preferred embodiment, the first tuner and cable box combination are used for tuning only if the channel is unavailable to the second tuner.

In the preferred embodiment, the first tuner is connected to a cable box, and the second tuner is connected to bare cable. Typically, a channel map for the first tuner (that is, the tuner and the controlled cable box) will have more channels represented in the channel map, as compared to the channel map for the second tuner, that is, the tuner connected to the bare cable. By way of example, the channel map for the first tuner and cable box would typically include premium channels. Upon receiving an indication that the channel is to be changed, the control system will determine if the required channel is available on the channel map for tuner two. If so, tuner two will preferably be utilized for that channel, and if the selector is not preset to connect tuner two to the display, it will be changed under action of the control system.

Thus, a method is provided for the control of a multiple tuner audiovisual display system wherein channel maps associated with the tuners are provided. The steps generally comprise an initial step of receiving a signal indicative of a desired channel change, and if necessary, determining the identity of the desired channel. The control system then determines whether the desired channel is available from the channel map for the tuner having a faster response time, and if so, utilizing that tuner to select the desired channel and to ensure that the selector couples that tuner to the display. In the event that the requested channel is unavailable on the channel map for the tuner which responds more rapidly, then the channel be selected from the slower tuner, that is, the tuner one and cable box combination.

In accordance with this invention, the system and method serves to provide for a system to select between the various tuners as the source of channel information. Thus, while the user may still have the ability to specifically select as between multiple tuners, in one implementation of this invention, the selection and coupling of one of the multiple tuners to be selectively coupled to the display is under action of the control system.

In yet another aspect of this invention, the system and methods may optionally include a preemptive tuning aspect. Use of sequential channel selection systems, such as an "up channel" selection, "down channel" selection, favorite channel list (often called a super quick view (SQV)) or a default selection, may be utilized to preemptively tune a tuner which is not currently coupled to the display by the selector. In the preferred embodiment, considering the example of a user activating the up channel selector, the system and method would utilize tuner two (the faster tuner connected to the bare cable) for available channels, but would serve to pretune tuner one via the cable box to the next channel which would be selected under the detected or default tuning scheme. In this way, the time delay associated with tuning the cable box at the time of receipt of a channel change request may be reduced or eliminated.

In yet another aspect of this invention, the channels on the channel map associated with the slower tuner may be remapped so as to provide intervening channels between those channels which must be selected through the slower tuner. In the preferred embodiment, the channels which must be selected via the slower tuner are remapped to channels sufficiently far apart such that the time required to effect preemptive channel changing is substantially the same as or longer than the time for the intervening channel changes on the fast tuner. In this way, no apparent delay in accessing channels as between the fast tuning and slow tuning system is observed by the user.

Accordingly, it is an object of this invention to provide a dual tuner display system in which channel selection appears to the user to be at the maximum possible channel change rate.

It is yet another object of this invention to provide a system and method for the selection of tuners according to a selection method implemented by a control system wherein tuners are selected so as to increase the speed of channel presentation.

It is yet another aspect of this invention to remap channels so as to effect faster channel selection.

In yet another aspect of this invention, the system permits the use of a single remote control for channel changing, optimally at a rate substantially equal to channel changing of the cable box by a cable box remote control.

DETAILED DESCRIPTION OF THE INVENTION

Figure 3:
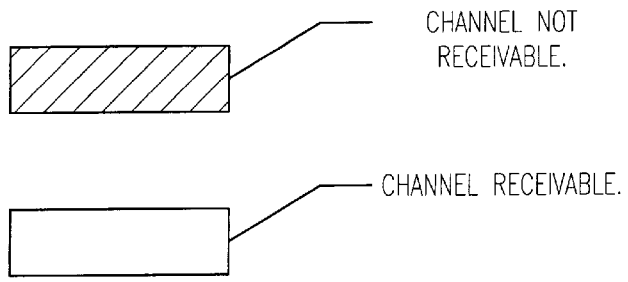
FIG. 3 is a schematic depiction of two channel maps, indicating which channels are receivable or not receivable on various tuners.
Figure 3:
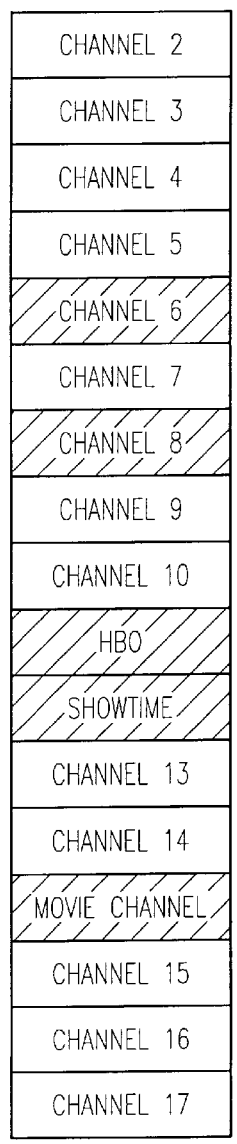
Figure 3:
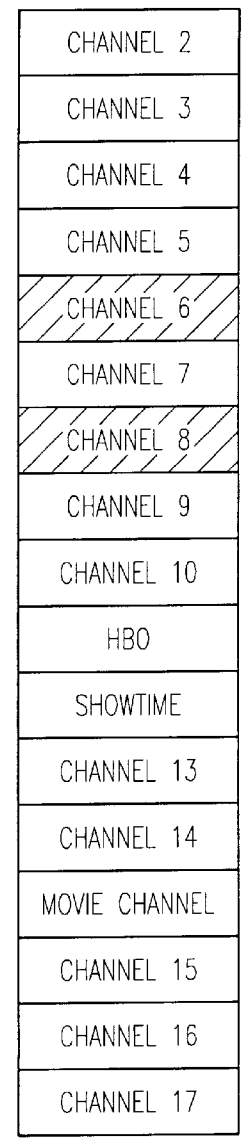

FIG. 3 shows a diagrammatic view of two channel maps, a channel map 71 for the tuner one and cable box combination and a channel map 72 for tuner two. For convenience, the disclosure may refer to a channel map for "tuner one" or "tuner", it being understood that the channel map relates to the combination of tuner one and the cable box. A "channel map" generally comprises a list of all channels which can be received by a system on a selected tuner. A channel map is typically generated by the system during an initiation or start-up phase. Typically, the system will tune to expected channel frequencies and then determine if picture information exists at that channel. In multiple tuner systems, a comparison is sometimes performed to determine whether the information on channels from different sources is the same. In the drawing of FIG. 3 (and FIG. 4) the convention of a channel being receivable is depicted by an unshaded box, whereas a channel which is not receivable is depicted by a shadow in the box.

Turning first to channel map 71 associated with tuner one, the channel map shows that channels 2, 3, 4 and 5 are receivable, whereas channel 6 is not. The channel map 71 then continues on with channel 7 being receivable but channel 8 not being receivable. The various other channels are then receivable, with selected premium channels such as HBO, Showtime and The Movie Channel being shown on channel map 71. Two premium channels, namely HBO and Showtime, are shown on adjacent channels. Channel map 71 also includes two premium channels, Showtime and The Movie Channel, separated by two regular channels 13 and 14. Channel map 72 for tuner two is the same as the channel map 71 for tuner one except that the premium channels (HBO, Showtime and the Movie Channel) are not receivable via tuner two).

Figure 4:
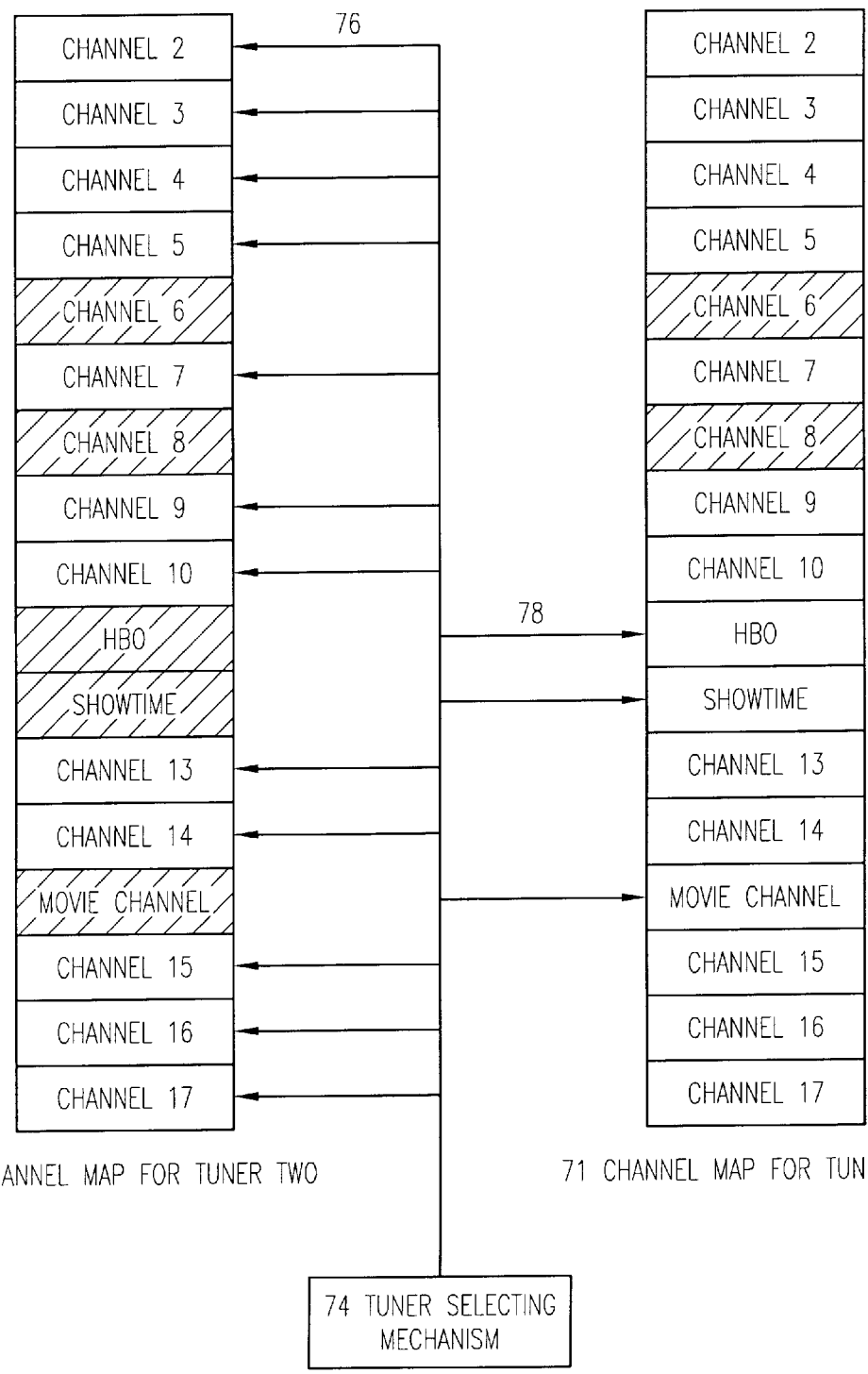
FIG. 4 is a schematic diagram of channel maps with an indication of channel selection from the channel maps.

FIG. 4 shows a diagrammatic presentation of channel map 71 for tuner one and channel map 72 for tuner two along with tuner selecting mechanism 74. The tuner selecting mechanism 74 is a control system for selecting channels in accordance with the methods of this invention. In one aspect of this invention, when a channel is receivable on tuner two as indicated on channel map 72, tuner two is utilized. FIG. 4 shows arrow 76 pointing leftward when the channel is selected from tuner two on channel map 72, and arrow 78 pointing towards the right when selecting a channel on tuner one from channel map 71. Thus, as shown in FIG. 4, in the preferred embodiment, all channels would be selected from channel map 72 except for the points of difference with channel map 71.

Figure 5:
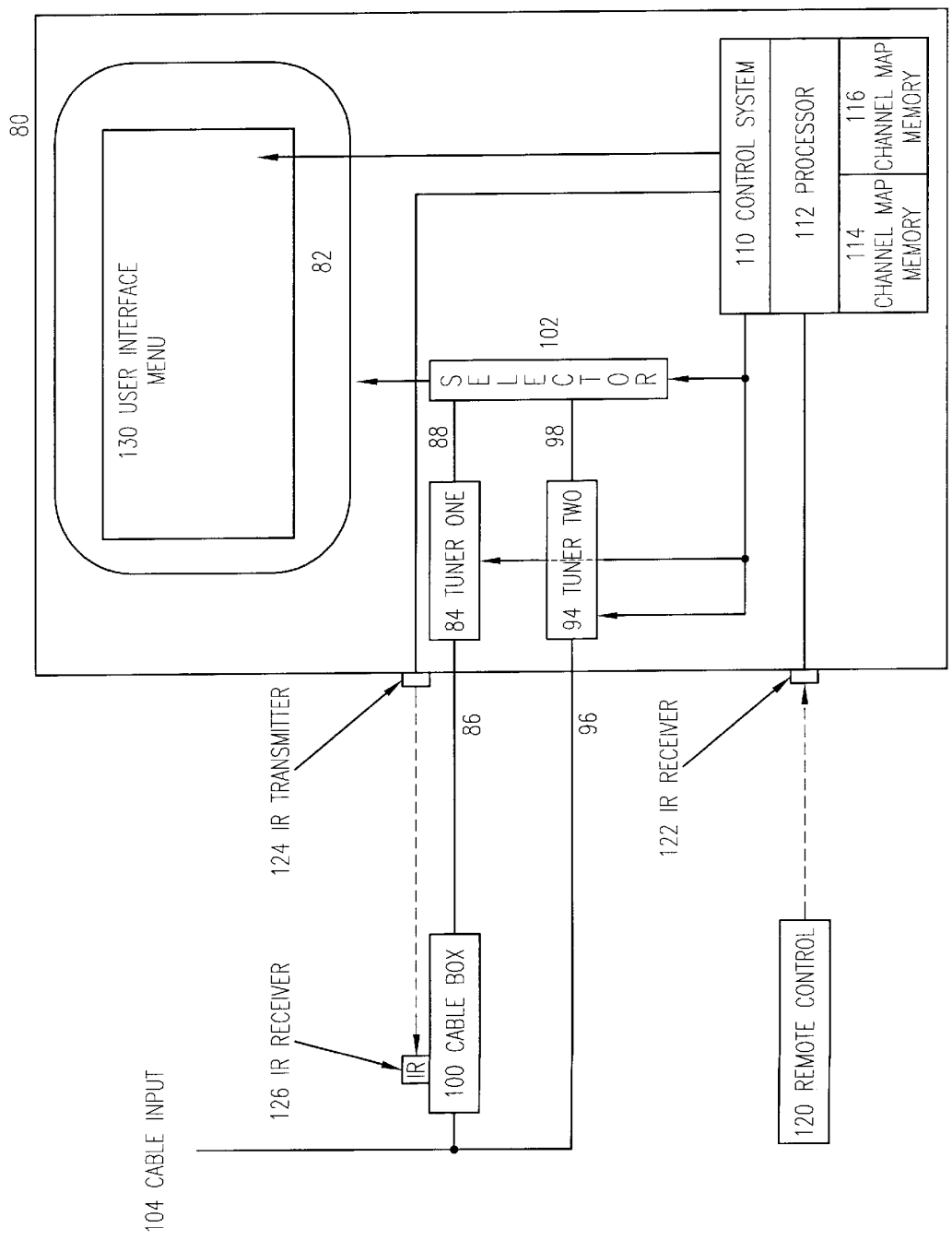
FIG. 5 is a schematic drawing of a dual tuner system including a selector and control system of this invention.

FIG. 5 shows a schematic diagram of one embodiment of the system of this invention. A television 80 (or other audiovisual system display) includes a display 82. A first tuner 84 (labeled tuner one, though the designation of "one" or "two" is arbitrary and may be reversed as desired) has an input 86 adapted for connection to the output of a cable box 100 or other decoder. Tuner two 94 includes an input 96 adapted for connection to a signal source such as a cable input 104. Tuner one 84 includes output 88 and tuner two 94 includes output 98 which are provided to the selector 102 which operates under action of the control system 110. The control system 110 also is coupled to and controls the selection on tuner 184 and tuner two 94.

The control system 110 serves to implement the methods in accordance with this invention. In the preferred embodiment, the control system 110 is an electronic device, either analog or digital, or a combination of both. Preferably, the control system 110 includes a control system which includes a processor 112 such as a microcomputer or microprocessor, and associated memory 114, 116. While these components have been shown diagrammatically as separate, though interconnected components, the particular selection of components may be modified as known to those skilled in the art so long as the functionalities and methods of this invention may be implemented.

A remote control 120 may be utilized with the system. A receiver 122 is adapted to receive output from the remote control 120, such as infrared radiation bearing information regarding television control. Any of the various techniques for encoding and communication known to those skilled in the art may be utilized. In the event that the television controls the cable box 100, a single remote control 120 may be utilized. Thus, as the remote control 120 is actuated by the user to indicate a channel change or channel selection, that information or signals representative thereof are passed to the television 80 and detected by receiver 122, which are then processed by the control system 110. If a channel change is to occur, and the cable box must be actuated so as to change tuning, the control system 110 actuates transmitter 124 which is directed towards detector 126. In this way, the television 80 may control the action of the cable box 100. While the preferred embodiment utilizes transmitted signal control, such as infrared signaling, other modes or methods of signaling, including over cable or wire may be utilized.

It will be appreciated that the system described herein, wherein the television 80 controls the action of the cable box 100 effectively utilizes the tuner in the cable box 100 as the tuner for the television. That is, it is typically the practice that tuner one 84 is set to a channel for communication with the cable box 100. Typically, the communication is placed on channel 3. Thus, it will be understood that references herein to "tuner one" or the "slow tuner" refer to the tuning action as effected either by the tuner one 84 itself, or the cable box 100 or the combination of such components as is required to effect tuning and display of the desired channel.

A user control interface menu 130 provides information on the display 82 for the user. At desired times, the user control interface menu 130 may be caused to display, in whole or in part, information useful to the user on the display 82.

Figure 6:
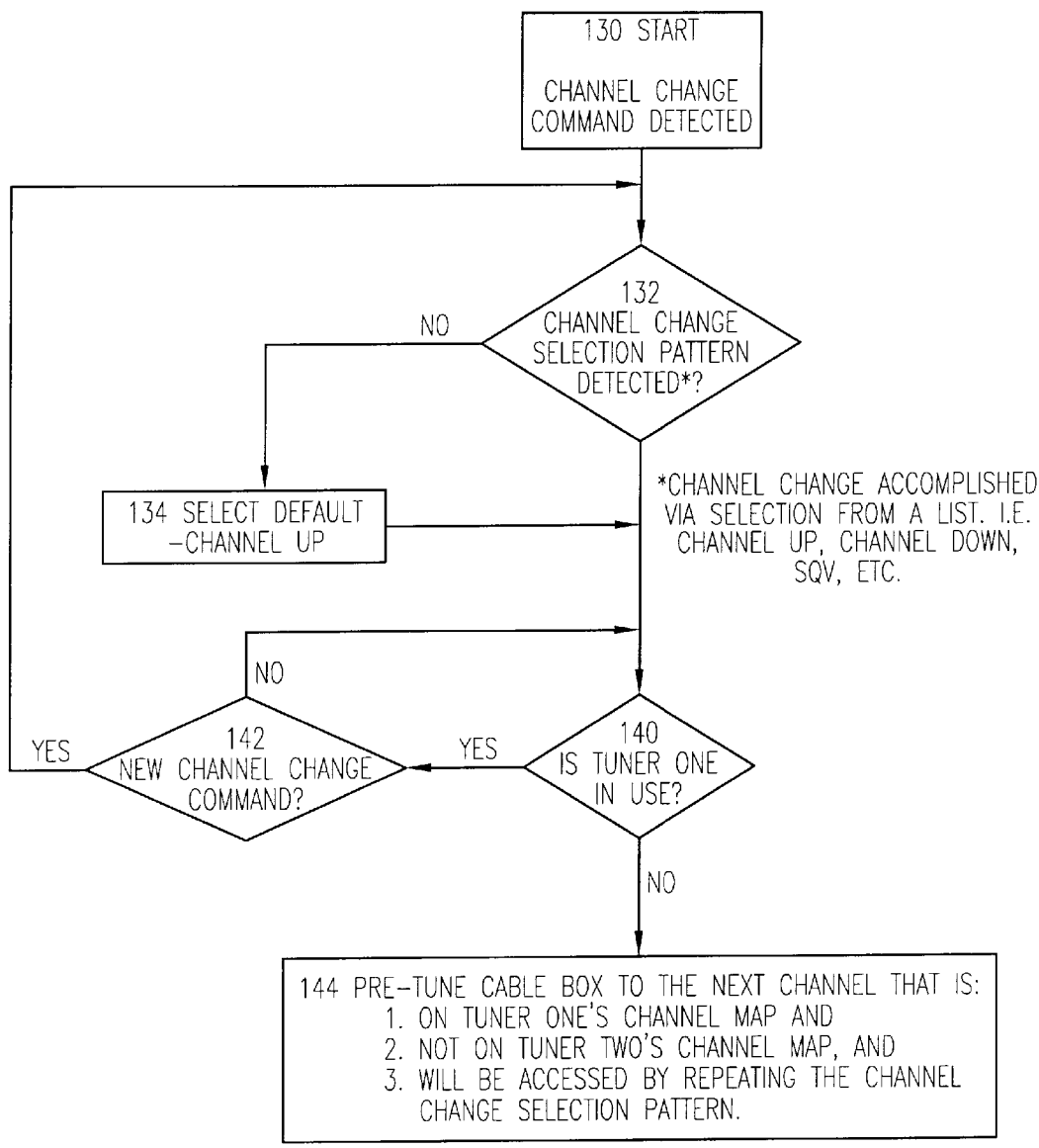
FIG. 6 is a flowchart for preemptive tuning in accordance with this invention.

FIG. 6 shows a flowchart of the preemptive tuning aspect of this invention. After start block 130, a decision block 132 determines whether a selection pattern has been detected, such as the use of the "up channel" selector, "down channel" selector, favorite channel selector, e.g., super quick view, or other pattern detected based upon the user's prior channel selection scheme. If no selection pattern is detected at decision block 132, the program at decision block 134 determines whether a default has been selected, and if so, applies it. As shown, one type of default might be to select the next channel "up" from the last selected.

The program flows to decision block 140 to determine whether tuner one (i.e., the slow tuner) is in use. If it is in use, the system will proceed to decision block 142 to check for a "new channel change command". If none exists, the system flows to decision block 140. If a channel change command exists, the program flows to decision block 132. If the tuner is not in use, then the program may flow to the action block 144 to set tuner one to the next channel assuming the channel the system determines to be the "next" channel is on the channel map, and preferably not on the fast tuner's channel map.

While the flowchart has shown the particular implementation of this invention in the sequence and mode described above, many variations and alternatives will be apparent to those skilled in the art. More particularly, the concept of preemptive tuning in combination with the use of channel selection and dual tuner systems serves to increase the speed with which channels may be viewed.

Figure 7:
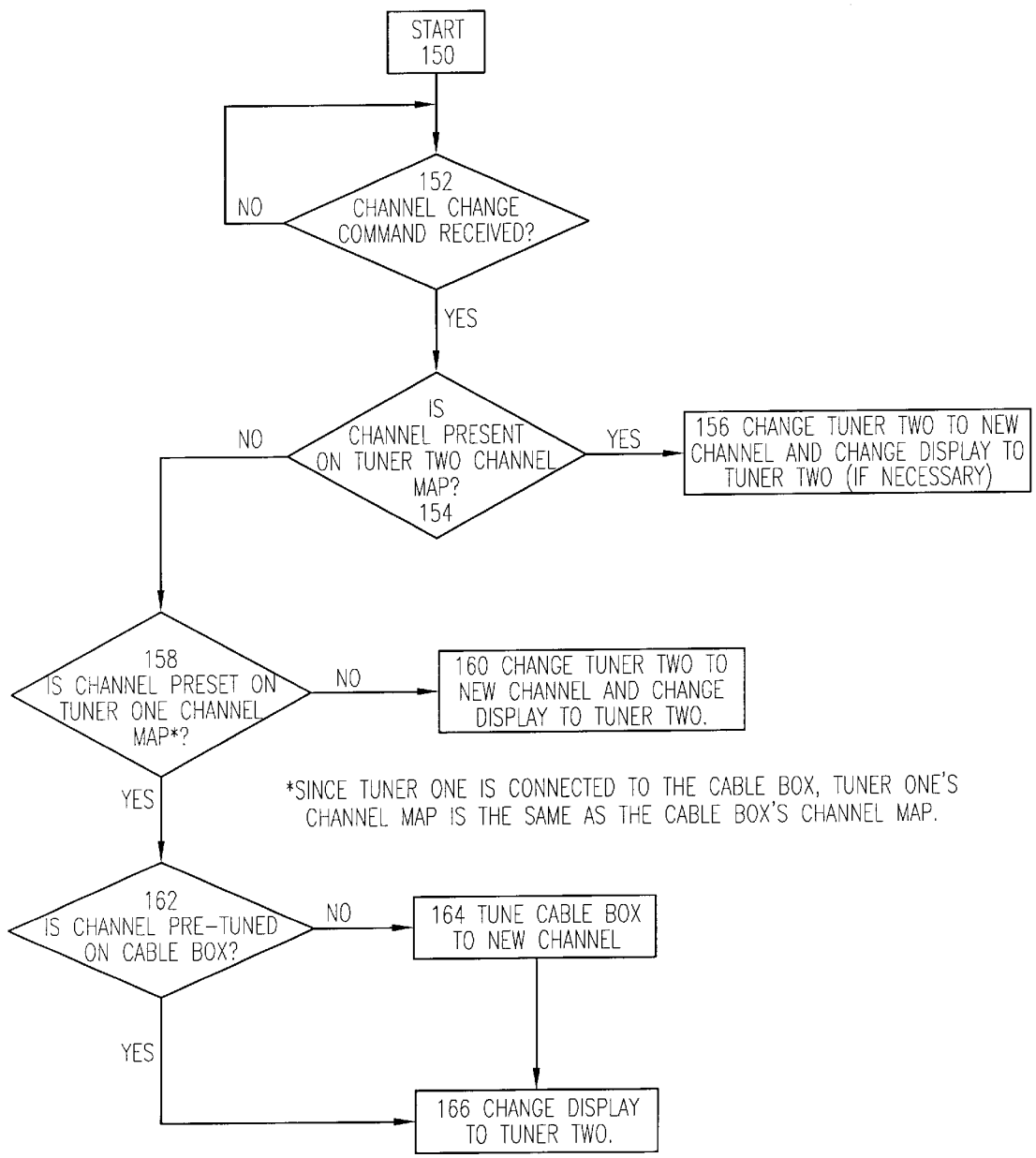
FIG. 7 is a flowchart showing aspects of the methods of this invention.

FIG. 7 shows a diagrammatic flowchart overview of the channel selection aspect of this invention. After start block 150 the system proceeds to action block 152 to determine if a channel change command has been received. If no channel change command has been received the system waits for a change channel command. If a change channel command is detected at action block 152, the program flows to decision block 154. Decision block 154 determines if the channel commanded is present on the tuner two channel map. Tuner two is the fast tuner. If decision block 154 detects that the channel is present in the tuner two channel map control is passed to action block 156, which then tunes tuner two to the requested channel and switches the television to display tuner two, if it is not already displayed tuner two. The control method then terminates, and the cycle can begin again.

If the commanded channel is not presented on the tuner two channel map, then program control is transferred to decision block 158. If the channel is not present on the tuner one channel map, then it is not present on either channel map and control is transferred to action block 160. Block 160 tunes the channel on tuner two, the faster tuner, even though it is not present on the tuner two channel map and switches the television to display tuner two, if it is not already displaying tuner two.

If decision block 158 detects that the requested channel is present on the channel two channel map then control is transferred to decision block 162. If decision block 162 detects that the cable box has been pre-tuned to the desired channel control is transferred to action block 166. Action box 166 switches the television display to tuner two and then the control method terminates. If decision block 162 detects that the requested channel is not pre-tuned on the cable box then control is transferred to action block 164. Action block 164 tunes the cable box to the new channel and transfers control to action block 166. Action block 166 switches the television display to tuner two and then the control method terminates.

Again, as with FIG. 6, it will be appreciated by those skilled in the art that various permutations and/or combinations of the above-described system may be utilized while fully utilizing the inventive aspect disclosed herein.

Figure 1:
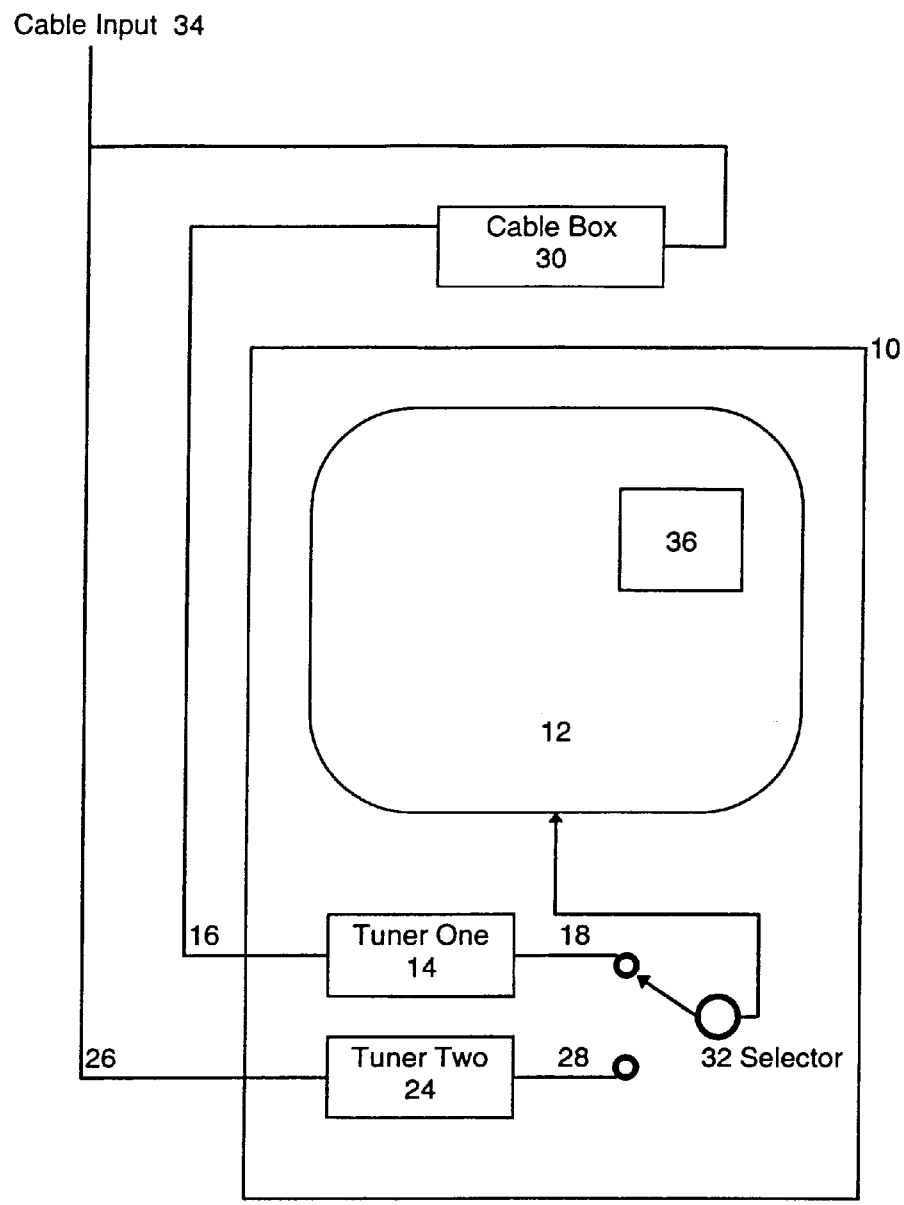
FIG. 1 is a schematic view of a prior art dual tuner display system.
Figure 1:
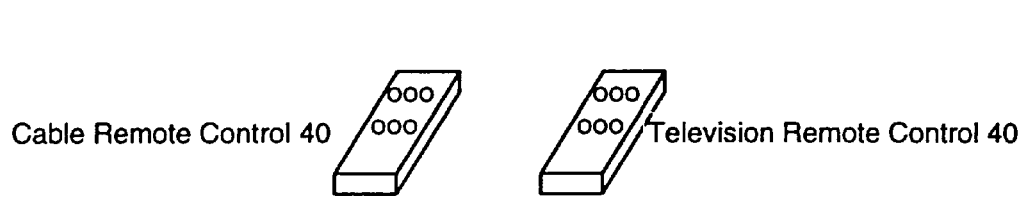
Figure 2:
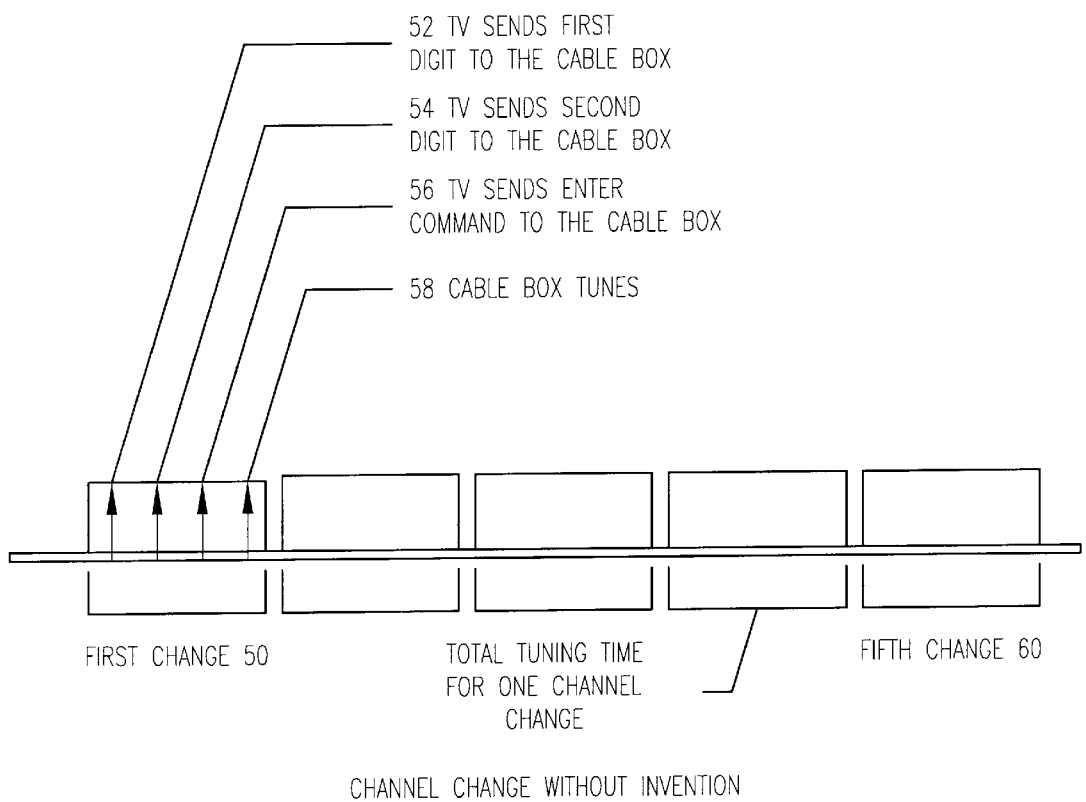
FIG. 2 is a schematic representation of time required for channel changes in prior art systems.
Figure 8:
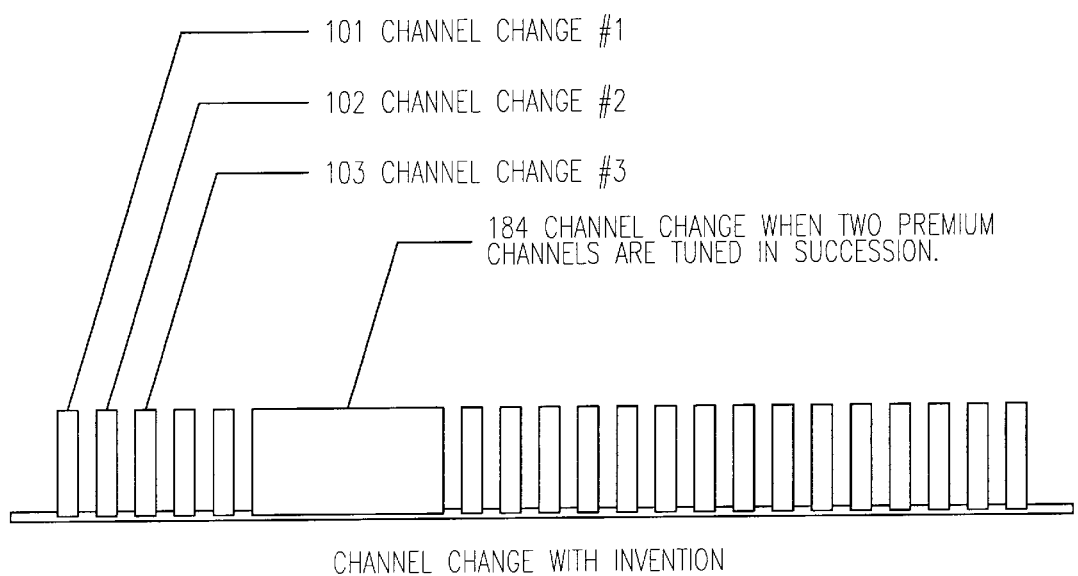
FIG. 8 is a diagrammatic view of a time to tune exemplar which includes sequential selection of premium channels selected by the slower tuner.

FIG. 8 shows a diagrammatic view of the time for channel changing when employing the subject inventions, generally showing time proceeding from left to right. Channel change 1 181 is depicted by the first block, channel change 2 by block 182 and channel change 3 by block 183. Generally, the time between the channel change blocks is substantially the same. Even when aspects of the invention are utilized, it may occur that a relatively larger amount of time is required for a channel change when two or more premium channels are tuned in succession. As shown in FIG. 8, the time block 184 is longer than the time for channel change from the bare cable. The time for change can approach 10 times the length of time for a channel change on the bare cable. Comparison of FIG. 2 (the prior art) with FIG. 8 shows the substantial improvement in channel change speed.

Figure 9:
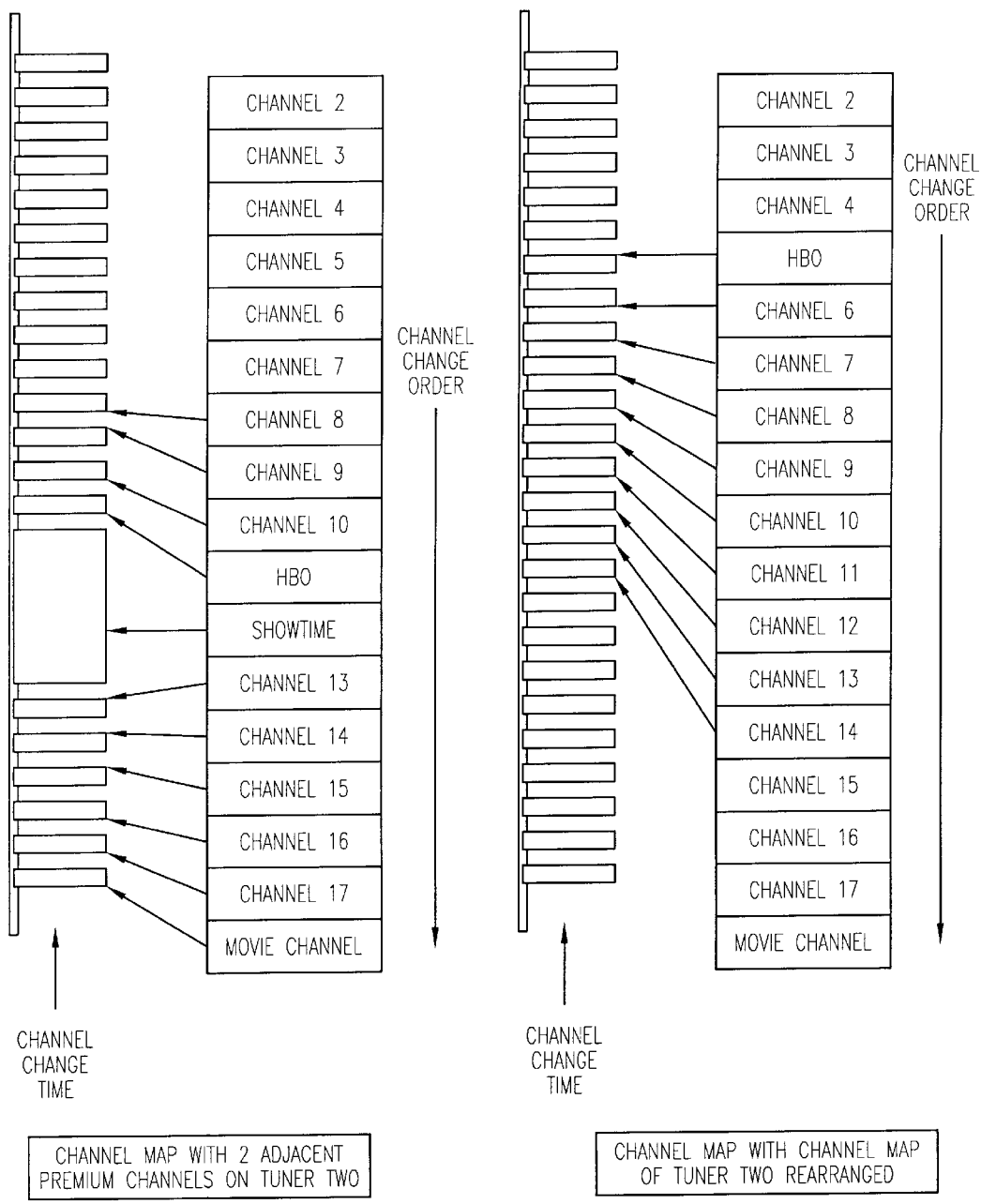
FIG. 9 is a diagrammatic depiction of the time to tune exemplar utilizing remapping of channels.

In one aspect of this invention, remapping of channels may be utilized to reduce the delays of the type shown in FIG. 8 at time block 184 where successive channels are accessed on the slow tuner, or more generally, where the time for accessing a subsequent channel via the slow tuner exceeds the time for accessing a channel via the fast tuner. In such a case, it may be desirable to remap the premium channels, namely, those accessed via the slower tuner. As shown in FIG. 9, the left-hand channel map as previously described and shown in FIG. 3 has been remapped on the right-hand side of FIG. 9. By separating what were adjacent premium channels (HBO and Showtime), the channels are now separated by multiple channels which can be tuned from the fast tuner, thereby permitting effectively uninterrupted channel changing. By remapping those channels, they may be spaced sufficiently far apart in the channel map such that the next premium channel can be pretuned before it is required to be displayed. By using a combination of pretuning and remapping, it will typically be possible to provide a tuning system in which the maximum possible rate of tuning appears for channels both on the bare cable as well as on the tuner connected to the cable box. Such a system is shown by the channel changing time of the remapped system in FIG. 9.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A method for the control of a multiple tuner audiovisual display system, one tuner being relatively slower than another tuner, and certain channels being available on the channel map of the slower tuner but not on the channel map of the faster tuner, comprising the steps, of:

receiving a signal indicative of a channel change and determining the desired channel, determining whether the desired channel is available from the channel map of a faster tuner, and if it is available, selectively tuning only the faster tuner to that channel, coupling the faster tuner to the display, and if the channel is not available on the channel map of the faster tuner, determining if it is available in the channel map of the slower tuner, and if so, coupling only the slower tuner to the display.

2. The method of claim 1, wherein the step of determining the desired channel includes the step of determining the desired channel based upon direct channel input.

3. The method of claim 1 for the control of a multiple tuner audiovisual display system wherein the step of determining the desired channel includes the step of selecting channels sequentially from a list.

4. The method of claim 1 for the control of a multiple tuner audiovisual display system wherein the step of determining the channel from a list includes a channel up selection.

5. The method of claim 1 for the control of a multiple tuner audiovisual display system wherein the step of determining the channel from a list includes a channel down selection.

6. The method of claim 1 for the control of a multiple tuner audiovisual display system wherein the step of determining the channel from a list includes a favorite channel list selection.

7. The method of claim 1 for the control of a multiple tuner audiovisual display system wherein the faster tuner is at least five times faster tuning than the slower tuner.

8. The method of claim 1 for the control of a multiple tuner audiovisual display system wherein the faster tuner is at least substantially ten times faster tuning than the slower tuner.

9. The method of claim 1 for the control of a multiple tuner audiovisual display system further including preemptive tuning of the tuner which is not currently selected by the selector.

10. The method of claim 9 for the control of a multiple tuner audiovisual display system wherein the preemptive tuning is based upon a detected selection pattern.

11. The method of claim 10 for the control of a multiple tuner audiovisual display system wherein the detected selection pattern is channel up.

12. The method of claim 10 for the control of a multiple tuner audiovisual display system wherein the detected selection pattern is channel down.

13. The method of claim 10 for the control of a multiple tuner audiovisual display system wherein the detected selection pattern is preferred channel list.

14. The method of claim 1 for the control of a multiple tuner audiovisual display system further including the step of remapping channels.

15. The method of claim 14 for the control of a multiple tuner audiovisual display system wherein the step of remapping of channels includes remapping of channels in the channel map associated with the slower tuner.

16. The method of claim 15 for the control of a multiple tuner audiovisual display system wherein the channels are remapped sufficiently far apart as to eliminate access delay with preemptive tuning.

17. The method of claim 9 for the control of a multiple tuner audiovisual display system further including the step of remapping channels.

\* \* \* \* \*